(12) United States Patent
Bosco et al.

(10) Patent No.: US 6,913,120 B2
(45) Date of Patent: Jul. 5, 2005

(54) METHOD OF SECURING A SHIM TO A BACKING PLATE AND SUBASSEMBLY FORMED THEREBY

(75) Inventors: Robert Bosco, Wolcott, CT (US); Carl Dambrauskas, Wolcott, CT (US); Richard Bochicchio, Glastonbury, CT (US)

(73) Assignee: Anstro Manufacturing, Inc., Wolcott, CT (US)

( * ) Notice: Subject to any disclaimer, the term of this patent is extended or adjusted under 35 U.S.C. 154(b) by 0 days.

(21) Appl. No.: 10/345,043

(22) Filed: Jan. 15, 2003

(65) Prior Publication Data

US 2004/0134725 A1 Jul. 15, 2004

(51) Int. Cl.⁷ ............................................. F16D 65/38
(52) U.S. Cl. ............................. 188/73.37; 188/250 G; 188/250 E
(58) Field of Search .................. 188/73.37, 72.36, 188/250 B, 250 G, 250 E, 73.1, 73.36

(56) References Cited

U.S. PATENT DOCUMENTS

| 4,603,760 A | * | 8/1986 | Myers | ..................... 188/73.37 |
| 5,285,873 A | | 2/1994 | Arbesman | |
| 5,427,213 A | * | 6/1995 | Weiler et al. | ........... 188/250 E |
| 5,842,546 A | | 12/1998 | Biswas | |
| 6,056,091 A | * | 5/2000 | Krug et al. | .............. 188/73.37 |
| 6,135,244 A | | 10/2000 | Le Bris | |
| 6,349,803 B2 | | 2/2002 | Brosilow | |

FOREIGN PATENT DOCUMENTS

| CA | 2101923 | | 8/1992 |
| DE | 41 04 812 | * | 8/1992 |
| DE | 43 40 451 | * | 6/1995 |

* cited by examiner

Primary Examiner—Robert A. Siconolfi
Assistant Examiner—Bradley T King
(74) Attorney, Agent, or Firm—Carmody & Torrance LLP

(57) ABSTRACT

A method of securing a shim against a first side surface of a backing plate for use in a brake assembly. The first side surface of the backing plate has a first extending pin and at least a second extending pin spaced apart from the first extending pin and the shim has apertures that align with the extending pins. The shim is coupled against the first side surface of the backing plate and the apertures are aligned with their corresponding pins such that the pins extend through the apertures. Each pin is sufficiently deformed to directly contact and lock down at least a portion of the edge of each respective apertures to secure the shim against the first side surface of the backing plate such that the respective pins do not extend above the top surface of the shim after deformation.

9 Claims, 3 Drawing Sheets

AFTER FASTENING

AFTER FASTENING

METHOD OF SECURING A SHIM TO A BACKING PLATE AND SUBASSEMBLY FORMED THEREBY

BACKGROUND OF THE INVENTION

This invention relates generally to interlocking attachments for securing shims to backing plates, and in particular, to an improved interlocking method for ensuring improved mechanical attachment of the shim to the backing plate, and an improved assembly formed thereby.

In a brake assembly, such as a disc brake assembly, a rotatable disc rotates with the axle of a wheel to be braked. Braking subassemblies, comprising a steel backing plate and a braking pad, may be disposed on opposite sides of the disc. As the subassemblies move inwardly under the force supplied by an actuated piston and a related caliper, the inner surfaces of the braking pads are engaged in frictional, braking contact with the disc. A high pitched and undesired brake squeal noise can be produced during such braking engagement of the pads on the disc, which may be produced by vibration of the subassemblies during braking actuation.

To reduce and/or to eliminate the undesired brake squeal noise, sound (or noise) dampening members, commonly referred to as shims, have been used by both original equipment manufacturers and by brake repair shops.

The noise dampening shim constructions are preferably positioned both between the actuated piston and the back surface of the related steel backing plate and also between the caliper and the back surface of its related steel backing plate.

Unfortunately, this frictional contact can cause a torque or twisting force on the shim by the related piston or caliper producing a shearing force in the adhesive of the shim. Under the extreme conditions of heat and vibration the adhesive by itself is not sufficient to prevent dislodging of the shim from the backing plate during braking.

The inventors are aware of several embodiments that are designed to further reduce shifting of the shim during braking, some of which are described in copending application Ser. No. 10/147,684, the disclosure of which is incorporated by reference as if fully set forth herein and commonly owned by the present assignee. Added to this body of art is the invention disclosed and claimed in the aforementioned '684 application.

A desirable shim, which is preferably used in connection with the present invention, as well as the invention disclosed in the aforementioned '684 application, is commercially sold by the assignee of the present invention under the trademark DRIFTLOK™. A DRIFTLOK™ shim includes one or more extruded holes that align with corresponding aligned recesses in the back surface of the backing plate. This construction yields a very desirable reduction on the shearing motion of the shim.

The present inventors however have discovered that still further developments in the art are desirable. For example, it has been discovered that use of integrally molded pins, as opposed to staples of the type disclosed in the '684 application or described in U.S. Pat. No. 6,349,803, can achieve other and possibly further desirable results.

U.S. Pat. Nos. 6,135,244; 5,285,873 and 5,842,546 are three patents that describe what the inventors believe is relevant art. However, the constructions set forth therein are all patentably different from the invention claimed herein.

For example, U.S. Pat. No. 5,842,546 to Biswas describes the use of a plurality of pins that project from a face of a first metal plate, pass through holes in a vibration damping layer and then a second metal plate, and then are "crushed" to fasten the first and second plates together with the damping layer therebetween. However, it is significant that the pins do not directly contact the damping layer, but rather one of the metal plates.

U.S. Pat. No. 6,135,244 to Le Bris describes a noise-preventing plate secured to a plate by the use of an adhesive and a boss that is inserted through a complementary shaped window in a plate. Although the boss is described as being hammerable, the closest embodiment described therein still has a ledge or collar of the boss resting upon the corresponding edge of the opening of the noise preventing plate through which the boss is inserted, thus describing that the boss material lies above the top surface of the shim.

Lastly, U.S. Pat. No. 5,285,873 to Arbesman merely describes a disk brake friction assembly where a friction pad is affixed to a backing plate by fixation nips extending from the backing plate and through respective openings in the function pad, thus being patentably distinguishable from the claimed shim assembly.

The inventors of the present invention believe that further advancements in the art are desirable. For example, two important requirements of a shim and backing plate assembly is the need to avoid interference by the element(s) securing the shim to the backing plate. As such, it can be readily seen that the construction described in the '244 patent is less than desirable. Secondly, any resulting construction must satisfactorily address the problem of delamination of the shim from the backing plate, which the inventors believe is achieved less than satisfactorily in the cited patents. Also important is the need to have the shim be able to sit flat on the backing plate.

The present inventors have recognized that improvements to the state of the art are achievable and believes that the present invention overcomes the perceived deficiencies in the prior art patents as well as provides the objectives and advantages set forth above and below.

OBJECTS AND SUMMARY AND OBJECTIVES OF THE INVENTION

Therefore, it is an object and advantage of the present invention to provide an improved mechanical interlocking attachment for securing a shim to a backing plate in a brake assembly.

It is a further object and advantage of the present invention to provide an improved methodology of attaching a shim to a backing plate in a brake assembly.

It is still a further specific object and advantage of the present invention to provide an improved methodology (and resulting assembly) of attaching a shim to a backing plate in a brake assembly that decreases the likelihood of delamination of the shim from the backing plate.

And it is yet a further object and advantage of the present invention to provide an improved methodology (and resulting assembly) of attaching a shim to a backing plate in a brake assembly that does result in any interference by the pins that assist in securing the shim to the backing plate.

Yet another object of the present invention is to provide a way to ensure that the shim sits flat on the backing plate during the mounting thereof on the backing plate, and thereafter.

Further objects and advantages of this invention will become more apparent from a consideration of the drawings and ensuing description.

The invention accordingly comprises the features of construction, combination of elements, arrangement of parts and sequence of steps that will be exemplified in the disclosure hereinafter set forth, and the scope of the invention will be indicated in the claims.

To overcome the perceived deficiencies in the prior art and to achieve the objects and advantages above and below, the present invention is, generally speaking, directed to a method of securing a shim against a first side surface of a backing plate, wherein the shim and the backing plate together comprise a subassembly for use in a brake assembly, the method comprises the steps of: stamping the first side surface of the backing plate so as to form a first extending pin and at least a second extending pin spaced apart from the first extending pin, each of the pins being integrally connected to the backing plate, and stamping the shim so as to form a first aperture and at least a second aperture spaced apart from the first aperture whereby a respective edge circumscribes each aperture, wherein the position of the at least two extending pins is based at least in part on the position of the first and second apertures or the position of the first and second apertures is based at least in part on the position of the at least two extending pins; coupling the shim against the first side surface of the backing plate and aligning the first aperture with the first pin and aligning the second aperture with the second pin such that the pins extend through the apertures; deforming each respective pin sufficiently to directly contact and lock down at least a portion of the edge of each respective apertures to secure the shim against the first side surface of the backing plate and wherein the respective pins do not extend above the top surface of the shim after deformation; whereby the shim is resisted from shifting on the backing plate and the pins cannot interfere with a piston or caliper that is in contact with the shim.

A subassembly formed from the foregoing method is also disclosed.

BRIEF DESCRIPTION OF THE DRAWINGS

The above set forth and other features of the invention are made more apparent in the ensuing Description of the Preferred Embodiments when read in conjunction with the attached Drawings, wherein.

Like numbers to identify like parts and features will be used among the various figures, but not all features will be specifically identified in each illustration. Also it should be clear that FIGS. 2 and 3 do not illustrate the entire width of either the shim or the backing plate for reasons of illustration sizing, but this should not be at all material to the understanding of the invention.

DETAILED DESCRIPTION OF THE PREFERRED EMBODIMENTS

Figure 1:
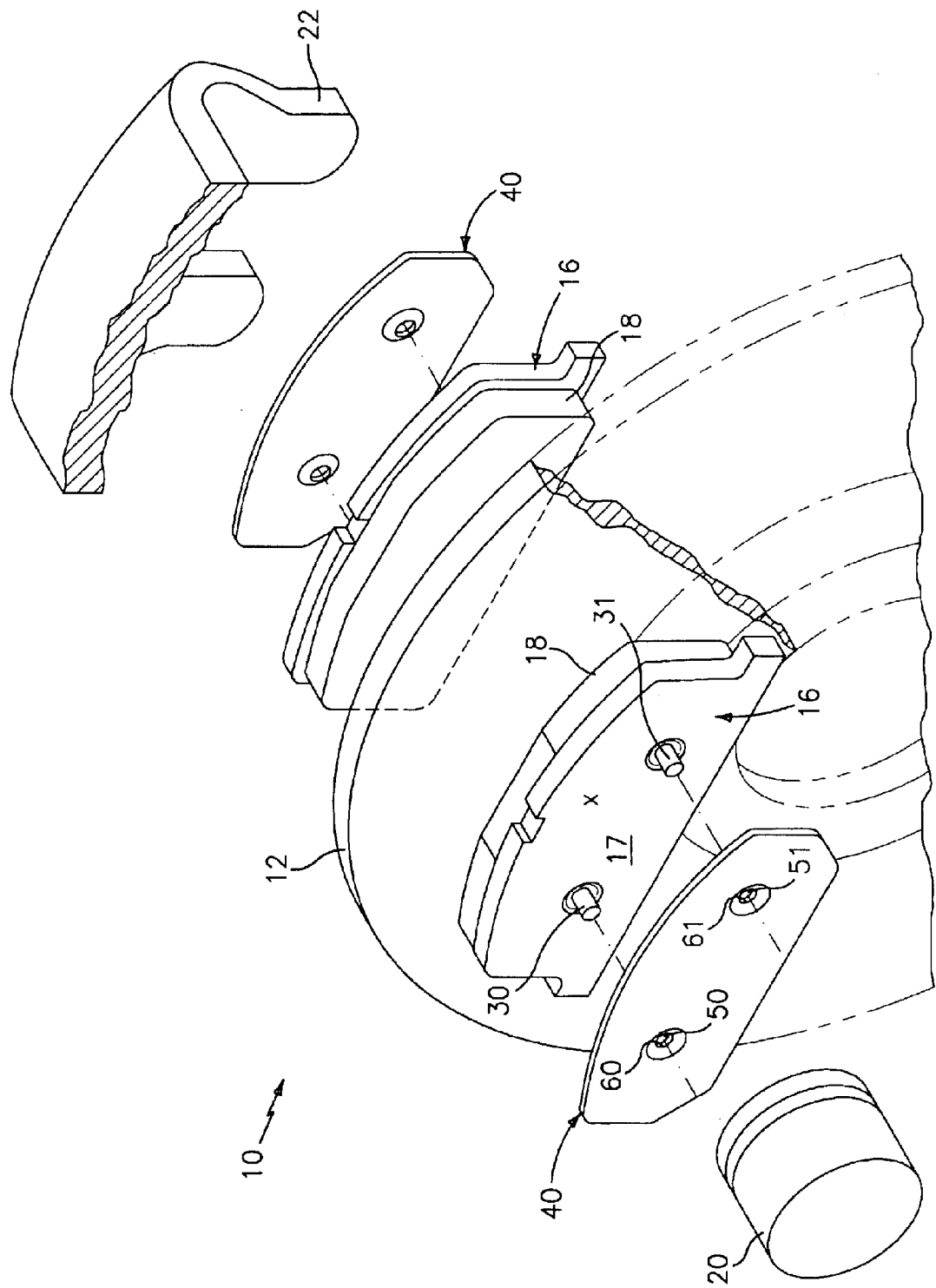
FIG. 1 is an exploded view of a portion of brake assembly, such as a disc-brake assembly, generally illustrating the mechanical interlocking attachment of a shim and backing plate constructed in accordance with the present invention.

Reference is very briefly made to FIG. 1 for a general description of an exploded view of a disc-brake assembly, generally indicated at 10. A more detailed description can be found in the aforementioned '684 application, and need not be repeated herein for purposes of brevity and because the general understanding of such a brake assembly is so well known to those skilled in the art.

By way of general background however, it is well-known that a disc brake assembly, generally indicated at 10, is used to stop a rotatable disc 12 which rotates with the axle of a wheel to be braked. Assembly 10, as defined herein, can be seen to include opposing braking subassemblies, each of which comprising a steel backing plate, generally indicated at 16, and a brake pad 18 mounted on the side of backing plate 16 facing disc 12. The two backing plates 16 may be suspended in a conventional caliper mounting structure by rods (not shown) which extend through backing plates 16, thus permitting backing plates 16 to move axially on the support rods. As would also be well understood, backing plates 16 are moved inwardly toward one another under the force applied by, for example, a hydraulically actuated piston 20 and a related caliper 22. In such a configuration, when piston 20 and caliper 22 press backing plates 16 inwardly, the inner surfaces of braking pads 18 are engaged in frictional, braking contact with disc 12.

The shims, referenced herein by numeral 40, are mounted on a back surface 17 of each respective backing plate 16 to reduce the brake squeal noise during such a braking or frictional engagement, with one shim 40 preferably positioned between piston 20 and the piston facing (back) surface 17 of backing plate 16 while the other shim 40 is positioned between caliper 22 and the back surface 17 of its associated backing plate 16.

The present invention significantly reduces the likelihood that either shim 40 will become sheared or detached from its respective backing plate 16 during such a braking or frictional engagement.

Reference is therefore now made to collectively to the illustrations for a further detailed description of the preferred embodiments of the present invention, namely a method of securing shim 40 against first side surface 17 of backing plate 16 and the construction, features and advantages of the improved subassembly comprising the backing plate and noise dampening member (i.e. shim) formed thereby.

Turning first to the construction of the subassembly that comprises the present invention the figures illustrate that backing plate 16 comprises a first extending pin 30 and at least a second extending pin 31 spaced apart from first extending pin 30. Each of the pins are integrally connected to backing plate 16 and their formation will be disclosed further below. As should be appreciated, the present invention requires at least two pins to provide the stability in mounting of the shim thereto. More pins can be used however, and a construction contemplating more than two pins is contemplated herein and covered by the claims. In fact, the current contemplated embodiment is to use three pins and corresponding apertures, wherein the third pin is located approximately at location identified by the "x" on surface 17 of backing plate 16, however more or less than three pins may be used in the final commercial embodiment.

On the other hand, shim 40 comprises at least a first aperture 50 and at least a second aperture 51 spaced apart from first aperture 50. Respective edges 60 and 61 circumscribe the apertures. With a third pin, obviously a corresponding third aperture would be provided.

Figure 2:
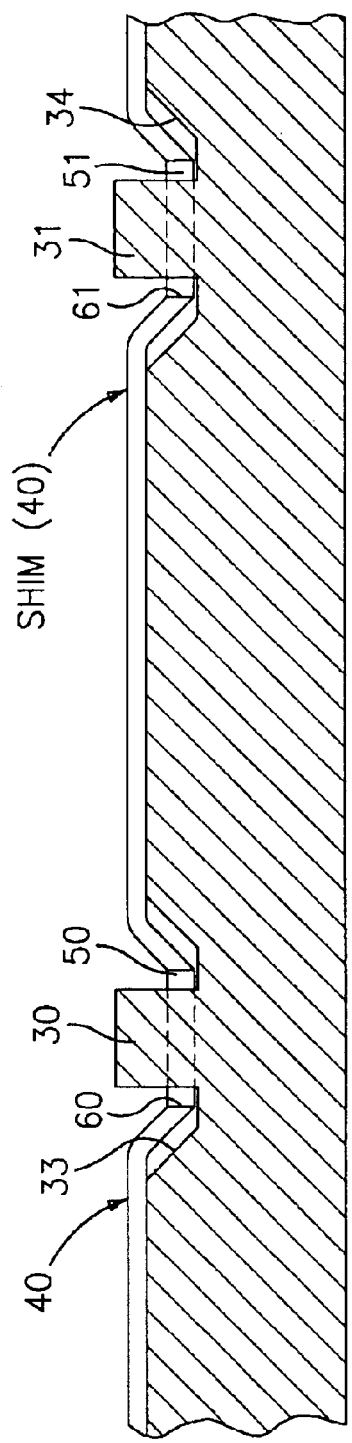
FIG. 2 is a partial cross-sectional view of a portion of a backing plate and a portion of a shim, illustrating the extended pins having been formed on the backing plate with the shim being placed thereon, and prior to the step of deforming the pin sufficiently to directly contact and lock down at least a portion of the edge of each respective aperture in the shim to mechanically interlock the shim and backing plate.
Figure 3:
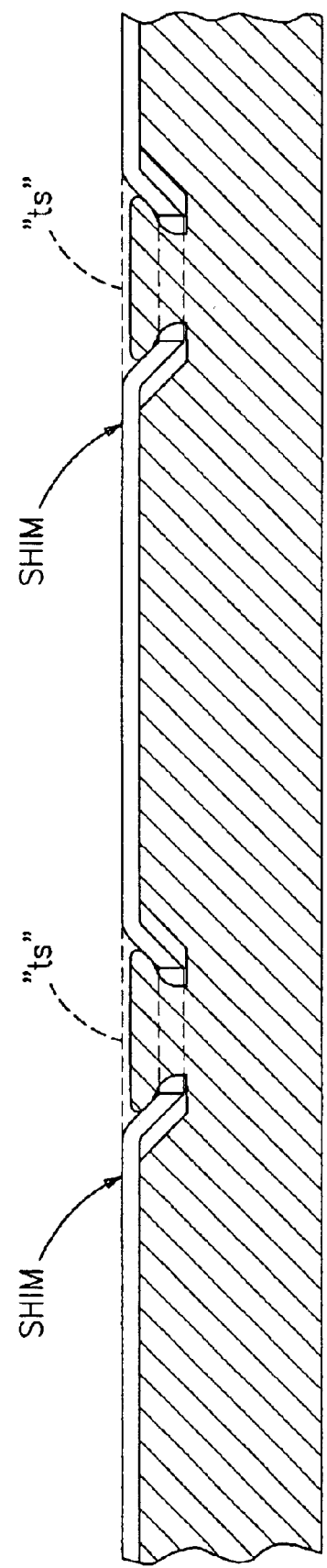
FIG. 3 is a partial cross-sectional view as in FIG. 2, except that the step of deforming the pin has occurred and the shim is thus directly contacted by the pin and locked down thereby so as to resist the shim from shifting on the backing plate.

As illustrated in the exploded view of FIG. 1 and further exemplified in the side views of FIGS. 2 and 3, the position of each pin (regardless of how many are provided, i.e. two or more) is respective aligned with its associated aperture (i.e. pin 30 with aperture 50 and pin 31 with aperture 51) when the shim 40 is coupled against side surface 17 of backing plate 16.

Turning now specifically to FIG. 3, in their final stage it can be seen that pins 30 and 31 are sufficiently deformed to directly contact and lock down at least a portion of an edge of each respective aperture (i.e. edge 60 of aperture 50 by pin 30; edge 61 of aperture 51 by pin 31) to secure shim 40 against side surface 17 of backing plate 16. Of course as well known to one skilled in the art, an adhesive layer may also be utilized to assist in the securing of shim 40 to surface 17.

Importantly, and in patentable distinction to some constructions found in the prior art, after deformation all of the pins in the present invention are below the top surface of shim 40. This feature is illustrated by the dotted line "ts" to show the plane of the top surface of shim 40. As should now be appreciated, shim 40 is resisted from shifting on backing plate 16 and, with all of the pins having been deformed so as be below the top surface of shim 40, the pins cannot interfere with the piston or caliper that contacts shim 40 during braking.

Preferably, as in the DRIFTLOK™ shim, shim 40 has angled or sloped leading edges at the location of the apertures to further assist in preventing sliding of the shim on the backing plate (assuming, as in the present case, that the backing plate 16 also has corresponding depressions (as indicated by reference numerals 33, 34) to accommodate the angled or sloped edges at the respective apertures 50, 51 of the shim, and thus assisting to resist shearing of the shim on the backing plate.

As indicated above, the method of securing shim 40 against side surface 17 of backing plate 16 to achieve the foregoing construction is also a feature of the present invention. In the preferred embodiment, the method comprises the steps of stamping surface 17 of backing plate 16 (by use of a powerpress for example) so as to form the first and second extending pins 30, 31. Further stamping in this manner can be used to form additional pins if desired or warranted. By using such a stamping process, all of the pins are integrally connected to backing plate 16. As alluded to above, the formation of pins 30 and 31 create a depressed ring (33, 34) around each respective pin 30 and 31. The outer sidewalls of each ring may be vertical or, as in the present case, inwardly sloped. Shaped as such, the rings respectively receive the angled or sloped sidewalls leading to edges 60, 61 of the apertures.

The method also comprises the step of stamping the shim so as to form the aforementioned apertures 50 and 51. Importantly, the position of the pins must coincide with the position of the apertures. In effect therefore, either the position of the pins is dictated at least in part on the position of the apertures or the position of the apertures is dictated at least in part on the position of the pins. On this point it should be well understood that neither the formation of the shim nor the formation of the backing plate needs to be done simultaneously, nor in any particular order, while it is even contemplated that the formation of each component may not even be done by the same entity, the requirement being only that each involved entity has the needed specifications to form the disclosed assemblies.

The method of the present invention further contemplates that the shim is thereafter coupled against side surface 17 of backing plate 16 and the respective pins are aligning with the respective apertures (i.e. aperture 50 with pin 30 and aperture 51 with pin 31) such that the pins extend through the apertures (FIG. 2).

The final step of the preferred method is to deform each respective pin 30, 31 sufficiently to directly contact and lock down at least a portion of the edge 60, 61 of each respective aperture to secure shim 40 against side surface 17 of backing plate 16, and further, to deform each pin sufficiently so that none of the pins extend above the top surface (indicated by the dotted line "ts") of the shim after deformation. Once performed, the shim is resisted from shifting on the backing plate and the pins cannot interfere with a piston or caliper that is in contact with the shim during braking.

The deformation of the pins can be achieved by the use of a kick press or other driving device (not shown), which as would be understood in the art, may be manually operated or automated. Again, an adhesive layer can be used to further reduce shearing of the shim.

From the foregoing it can be seen that each pin assists in resisting shifting or rotation of shim 40 on backing plate 16. At least two pins are preferred with each braking subassembly 14. By utilizing pins in which the top thereof can be sufficiently deformed to ensure that they are below the top surface of shim 40, there is the assurance that the pins do not interfere with the positioning or functioning of piston 20 or caliper 22 or other disc brake structures.

One skilled in the art would clearly know how to construct a suitable shim, as this person would know that shims may be comprised of multi-layer materials, such as aluminum, metal alloys, laminates or layers of metals and adhesive and other materials, such as plastic if desirable, with the adhesive being of acrylic, thermal setting adhesive, or a combination of both.

Figure 4:
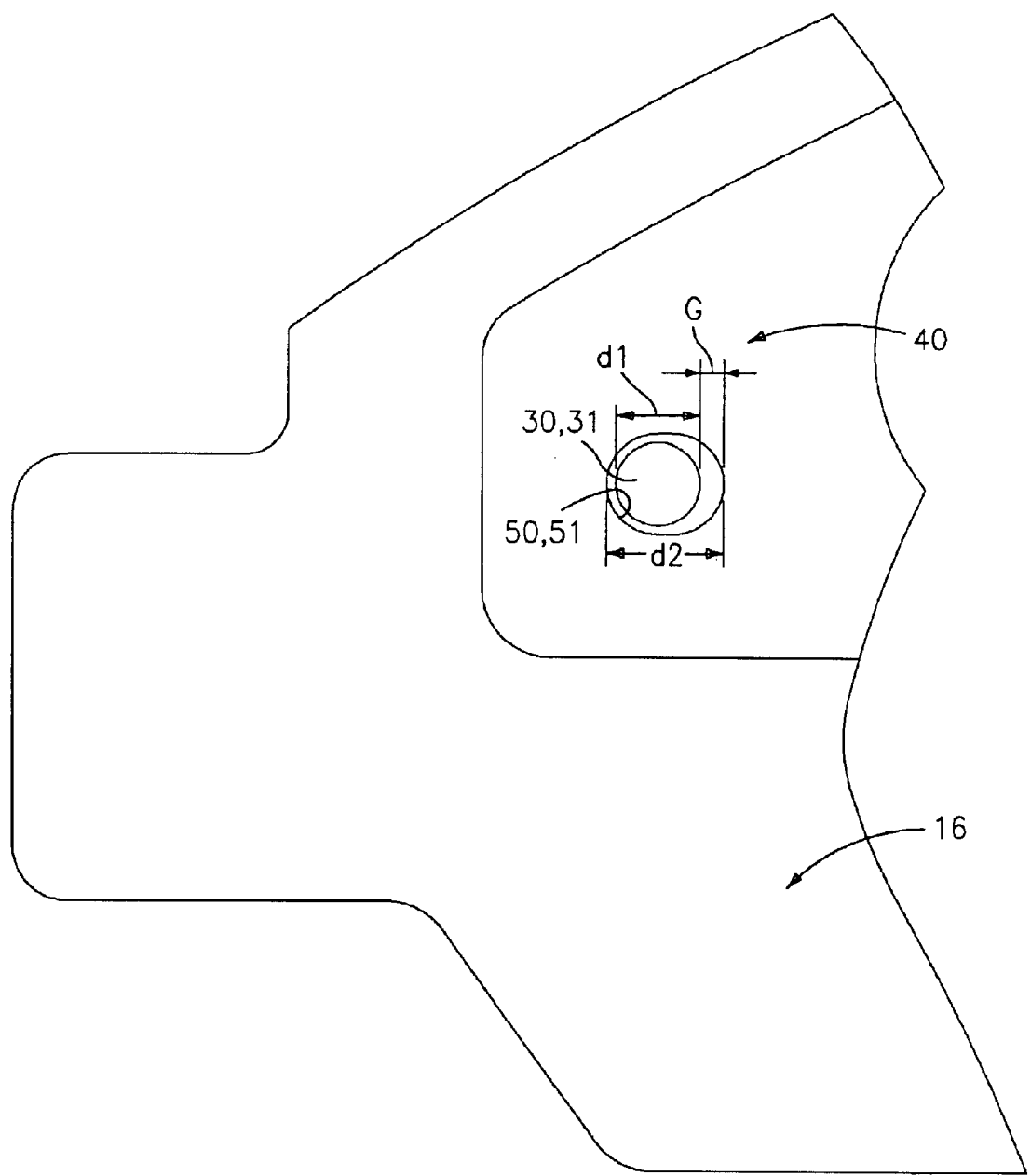
FIG. 4 illustrates a portion of a shim and backing plate, and specifically, that a gap G is provided between the pin and corresponding aperture to ensure that there is sufficient space for the shim to properly sit on the surface of the backing plate during the mounting thereof.

On this point, reference is made to FIG. 4 which illustrates the relevant portion of shim 40 and backing plate 16, and specifically, that a gap G is provided between pills 30, 31 and the corresponding apertures 50, 51 to ensure that there is sufficient space for the shim to properly sit on the surface 17 of plate 16 during the mounting thereof. This gap G can also be seen in FIGS. 2 and 3. However, once locked down, there is no further shifting of the shim on the backing plate, and is thus an advantageous feature not described in the aforementioned patents as it relates to the claimed invention. That is, the method of the present invention provides for the step of providing the apertures with a diameter slightly larger than the diameter of the pins (i.e. compare diameters $d_1$ (pin) and $d_2$ (aperture)) so as to form a gap G between each respective pin and aperture, wherein the shim is prevented from buckling upon the deformation of the pins due to the ability of the shim to slide upon the first side surface until all the pins have been deformed. In a preferred embodiment, the gap G is 0.02 inches.

While the invention has been particularly shown and described with respect to preferred embodiments thereof, it will be understood by those skilled in the art that changes in form and details may be made therein without departing from the scope and spirit of the invention.

It can now be seen that a subassembly constructed in accordance with the present invention improves and/or furthers the state of the art with respect to the mechanical interlocking arrangements between a shim and a backing plate in a brake assembly, such as a disc-brake assembly. In particular, the present invention reduces the likelihood of shearing between the shim and backing plate during frictional engagement of the brake pads and the disc. Furthermore, the present invention provides for alternative embodiments so as to be useable with a variety of shim constructions, such as those mentioned above. Importantly, the foregoing is not intended to disparage or convey negative advantages in any way to the invention disclosed in the '684 application.

What is claimed is:

1. A method of securing a shim against a first side surface of a backing plate, wherein the shim and the backing plate together comprise a subassembly for use in a brake assembly, the method comprises the steps of:

stamping the first side surface of the backing plate so as to form a first extending pin and at least a second extending pin spaced apart from the first extending pin, each of the pins being integrally connected to the backing plate, stamping the shim so as to form a first aperture and at least a second aperture spaced apart from the first aperture, wherein the stamping creates sidewalls extending from a top surface of the shim to an edge of each respective aperture to recess the first aperture and the at least second aperture below the top surface of the shim, wherein the position of the at least two extending pins is based at least in part on the position of the first and second apertures or the position of the first and second apertures is based at least in part on the position of the at least two extending pins;

coupling a back surface of the shim against the first side surface of the backing plate and aligning the first aperture with the first pin and aligning the second aperture with the second pin such that the pins extend through the apertures;

deforming each respective pin sufficiently to directly contact and lock down at least a portion of the sidewall of the shim to secure the shim against the first side surface of the backing plate, wherein the respective pins in their deformed condition remain below the top surface of the shim after deformation and cannot interfere with a piston or caliper that contacts the shim during braking;

whereby the shim is resisted from shifting on the backing plate.

2. The method as claimed in claim 1, including the stop of providing the first and second apertures with a diameter slightly larger than the diameter of the pins so as to form a gap G between each respective pin and aperture;

wherein the shim is prevented from buckling upon the deformation of the pins due to the ability of the shim to slide upon the first side surface until all the pins have been deformed.

3. A subassembly for use in a brake assembly, the subassembly comprising:

a backing plate including a first extending pin and at least a second extending pin spaced apart from the first extending pin, each of the pins being integrally connected to the backing plate;

a noise dampening member having a first aperture and at least a second aperture spaced apart from the first aperture whereby a respective edge circumscribes each aperture the noise dampening member having sidewalls extending from a top surface of the noise dampening member to an edge of each respective aperture, wherein each respective aperture is recessed below the top surface of the noise dampening member;

wherein the position of each of the at least two extending pins is aligned with and extends through the respective first and second apertures when a back surface of the noise dampening member is coupled against a first side surface of the backing plate;

wherein each respective pin is sufficiently deformed to directly contact and lock down at least a portion of the sidewall of the noise dampening member to secure the noise dampening member against the first side surface of the backing plate, wherein the respective pins in their deformed condition remain below the top surface of the noise dampening member after deformation and cannot interfere with a piston or caliper that contacts the shim during braking; and whereby the noise dampening member is resisted from shifting on the backing plate.

4. The subassembly as claimed in claim 3, wherein the backing plate has recesses surrounding each pin and the sidewalls of the noise dampening members are sloped or angled and are received by the recesses in the backing plate to further reduce shifting of the noise dampening member on the backing plate.

5. The subassembly as claimed in claim 3, wherein the noise dampening member is a multilayered member comprising an adhesive layer, wherein the adhesive layer is in direct contact with the backing plate.

6. The subassembly as claimed in claim 3, wherein the first and second apertures have a diameter slightly larger than the diameter of the pins so as to form a gap G between each respective pin and aperture;

wherein the noise dampening member is prevented from buckling upon the deformation of the pins due to the ability of the noise dampening member to slide upon the first side surface until all the pins have been deformed.

7. A method of securing a shim against a first side surface of a backing plate, wherein the first side surface of the backing plate has a first extending pin and at least a second extending pin spaced apart from the first extending pin, each of the pins being formed from the material comprising the backing plate, and the shim comprises a first aperture and at least a second aperture spaced apart from the first aperture wherein the first aperture and the at least second aperture are recessed below a top surface of the shim by sidewalls extending from the top surface of the shim to an edge of each respective aperture, wherein the method comprises the steps of:

coupling a back surface of the shim against the first side surface of the backing plate and aligning the first aperture with the first pin and aligning the second aperture with the second pin such that the pins extend through the apertures;

deforming each respective pin sufficiently to directly contact and lock down at least a portion of the sidewall of the shim to secure the shim against the first side surface of the backing plate, wherein the respective pins in their deformed condition remain below the top surface of the shim after deformation and cannot interfere with a piston or caliper that contacts the shim during braking;

whereby the shim is resisted from shifting on the backing plate.

8. A method of securing a shim against a first side surface of a backing plate, wherein the first side surface of the backing plate has formed thereon a first extending pin and a first indentation about the first extending pin and at least a second extending pin and a second indentation about the at least second extending pin, each of the pins being formed from the material comprising the backing plate, wherein the shim is comprised of a multilayered material, wherein the shim has a top surface and a back surface and a first aperture and at least a second aperture spaced apart from the first aperture whereby a respective edge circumscribes each aperture, wherein the shim includes a first countersunk region and at least a second countersunk region and wherein the first aperture is formed in the first countersunk region and the at least second aperture is formed in the at least second countersunk region to recess the first aperture and the at least second aperture below the top surface of the shim, wherein the method comprises the steps of:

coupling the back surface of the shim against the first side surface of the backing plate and aligning the first aperture with the first pin and aligning the second aperture with the second pin such that the pins extend through the apertures;

deforming each respective pin sufficiently to directly contact and lock down at least a portion of the countersunk region that circumscribes each respective aperture to secure the shim against the first side surface of the backing plate and wherein the respective pins in their deformed condition remain below the top surface of the shim after deformation and cannot interfere with a piston or caliper that contacts the shim during braking;

wherein the shim is resisted from movement at least in part by (i) the countersunk regions being positioned in the respective indentations and (ii) the locking down at least a portion of the countersunk region that circumscribes each aperture.

9. A subassembly for use in a brake assembly comprising:

a backing plate comprising a first extending pin and a first indentation about the first extending pin and at least a second extending pin and a second indentation about the second extending pin, each of the pins being formed from the material comprising the backing plate;

a noise dampening member comprised of a multilayered material, wherein the noise dampening member has a top surface and a bottom surface and a first aperture and at least a second aperture spaced apart from the first aperture whereby a respective edge circumscribes each aperture, wherein the noise dampening member includes a first countersunk region and at least a second countersunk region and wherein the first aperture is formed in the first countersunk region and the at least second aperture is formed in the at least second countersunk region to recess the first aperture and the at least second aperture below the top surface of the shim;

wherein the first aperture is aligned with the first pin and the at least second aperture is aligned with the at least second pin such that the pins extend through the respective apertures when the bottom surface of the noise dampening member is coupled against a first side surface of the backing plate;

wherein each respective pin is sufficiently deformed to directly contact and lock down at least a portion of the countersunk region that surrounds each respective aperture to secure the shim against the first side surface of the backing plate and wherein the respective pins in their deformed condition remain below the top surface of the noise dampening member after deformation and cannot interfere with a piston or caliper that contacts the shim during braking;

wherein the noise dampening member is resisted from movement at least in part by (i) the countersunk regions being positioned in the respective indentations and (ii) the locking down of at least a portion of the countersunk region that circumscribes each aperture.

* * * * *